United States Patent [19]

Graetz et al.

[11] Patent Number: 4,632,717
[45] Date of Patent: * Dec. 30, 1986

[54] METHOD OF MAKING BOOK STYLE ALBUMS

[75] Inventors: Herbert Graetz, Chicago, Ill.; Ronald C. Unterreiner, Cape Girardeau, Mo.

[73] Assignee: Blair Industries, Inc., Scott City, Mo.

[*] Notice: The portion of the term of this patent subsequent to Nov. 26, 2002 has been disclaimed.

[21] Appl. No.: 770,795

[22] Filed: Aug. 29, 1985

Related U.S. Application Data

[63] Continuation-in-part of Ser. No. 601,949, Apr. 19, 1984, Pat. No. 4,555,290.

[51] Int. Cl.⁴ .............................................. B29C 3/04
[52] U.S. Cl. ................................... 156/245; 156/250; 156/267; 206/557; 206/562; 206/563; 206/564; 206/565
[58] Field of Search ............... 156/245, 250, 252, 285, 156/267; 264/545; 206/557, 558, 560, 562, 563, 564, 565; 53/411, 427, 450, 453, 456, 168

[56] References Cited

U.S. PATENT DOCUMENTS

| | | | |
|---|---|---|---|
| 3,512,332 | 5/1970 | Klein | 53/453 |
| 3,577,700 | 5/1971 | Bippus et al. | 53/453 |
| 3,673,760 | 7/1972 | Canamero et al. | 53/453 |
| 3,902,598 | 9/1975 | Koob et al. | 206/387 |
| 4,175,995 | 11/1979 | Walter | 156/285 |
| 4,184,594 | 1/1980 | Hehn | 206/387 |
| 4,209,957 | 7/1980 | Utzmann | 53/453 |
| 4,277,931 | 7/1981 | Mahaffy et al. | 53/453 |
| 4,407,410 | 10/1983 | Graetz et al. | 206/387 |
| 4,432,827 | 2/1984 | Graetz et al. | 156/245 |
| 4,555,290 | 11/1985 | Graetz et al. | 156/245 |

FOREIGN PATENT DOCUMENTS

2503667 10/1982 France.

*Primary Examiner*—Caleb Weston
*Attorney, Agent, or Firm*—Hill, Van Santen, Steadman & Simpson

[57] ABSTRACT

A plurality of different types of book style cassette holders or albums are selectively progressively produced by an in-line operation having stations which can be by-passed and selectively actuated to omit or add steps to produce the different types. The initial steps in the method unwind a relatively rigid or stiff thermoplastic sheet from a roll, successively thermoform the sheet into blanks having a plurality of pairs of adjoining hollow wall album trays in side-by-side relation connected by a flexible spine and surrounded by marginal portions. The blanks are fed successively, hollow face upwardly, through successive stations which apply adhesive and cardboard slabs over the bottoms of the trays. Subsequent stations either deposit individual printed cover sheets onto the blanks, or a continuous cover sheet fed from a roll. Succeeding stations selectively apply individual printed sheets over the continuous cover sheet and a transparent film over the printed sheets. The printed sheet station can be by-passed and a transparent film can be applied over all or part of the cover sheet. Subsequent stations bond the superimposed sheets together, sever the margin strips around and between the trays, and strip the margins from the albums. Selective operation and by-passing of stations provides many combinations for producing different types of holders or albums.

17 Claims, 16 Drawing Figures

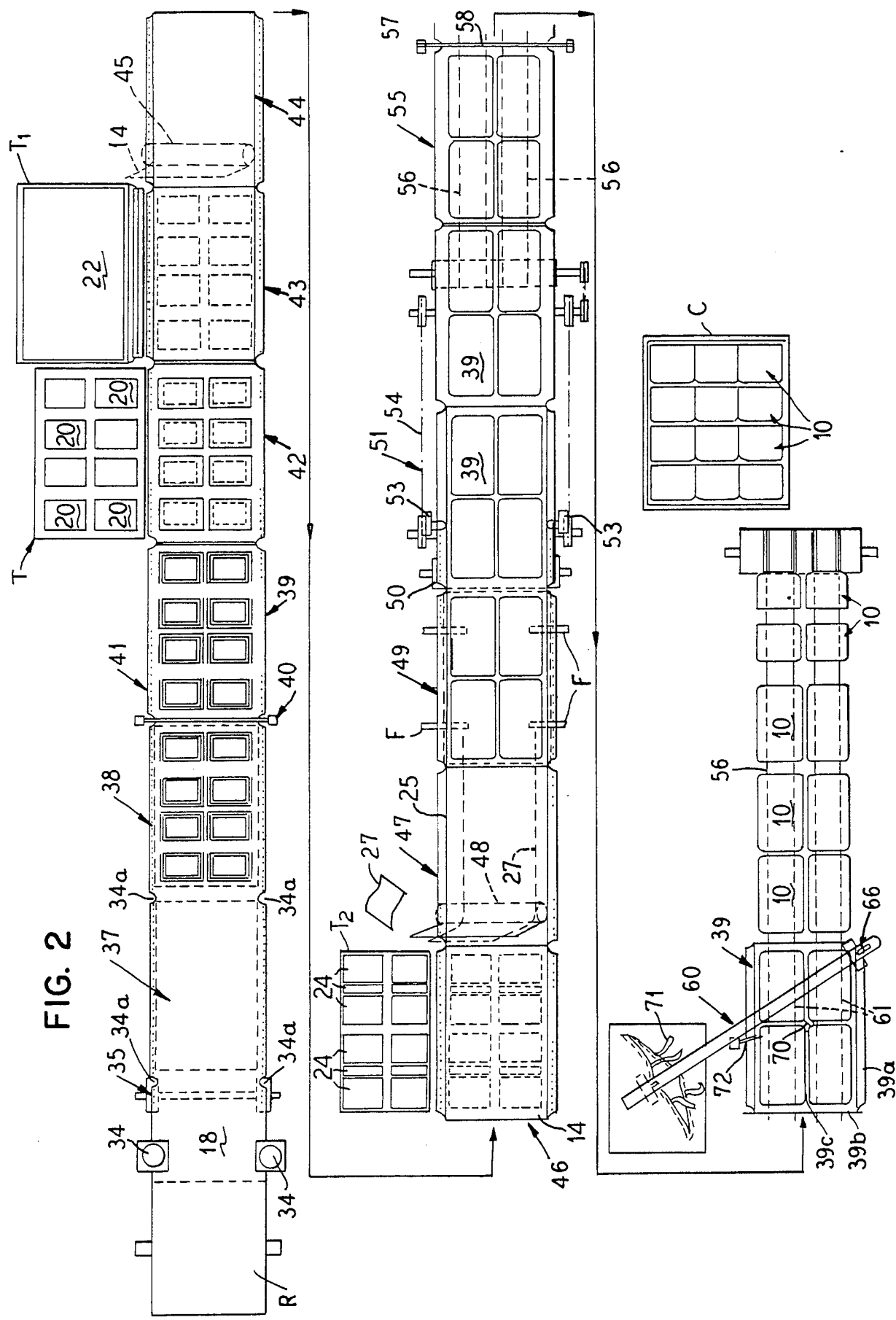

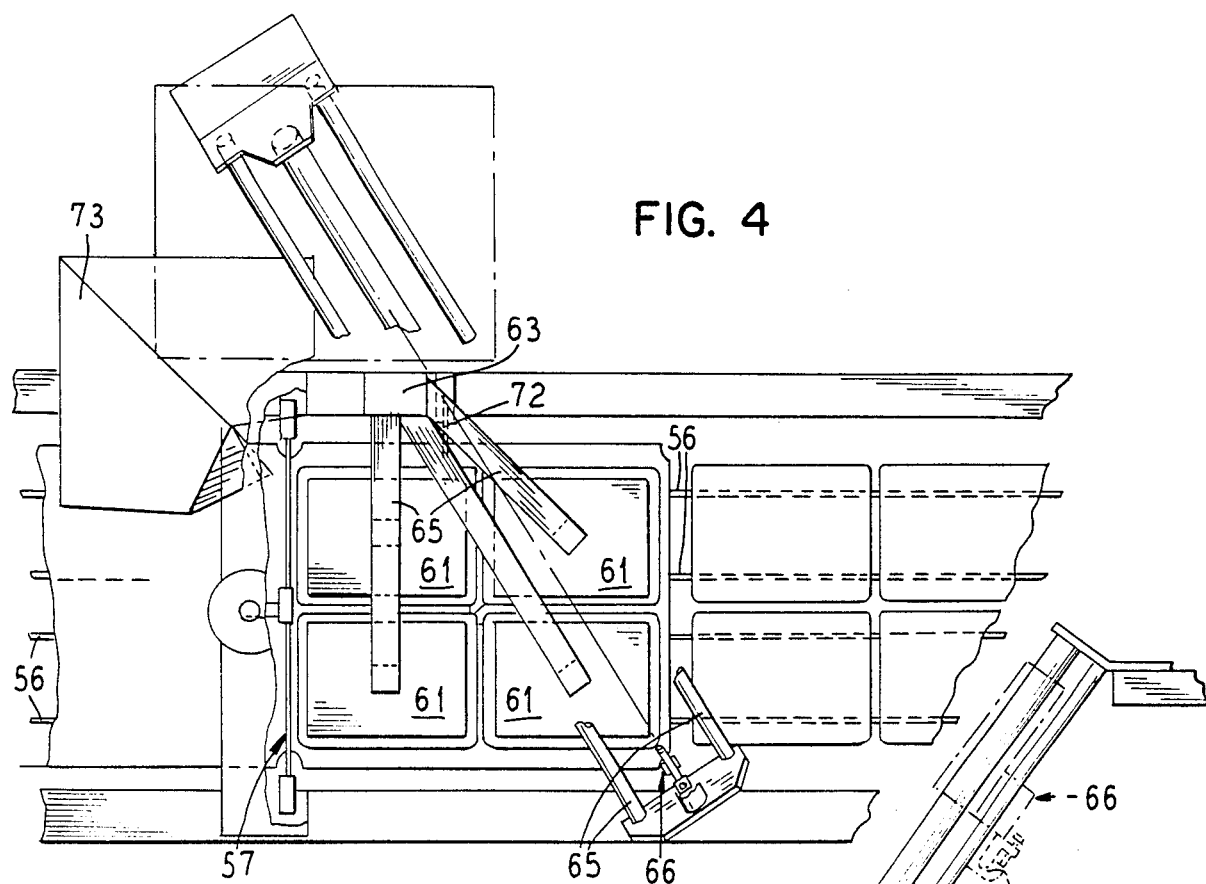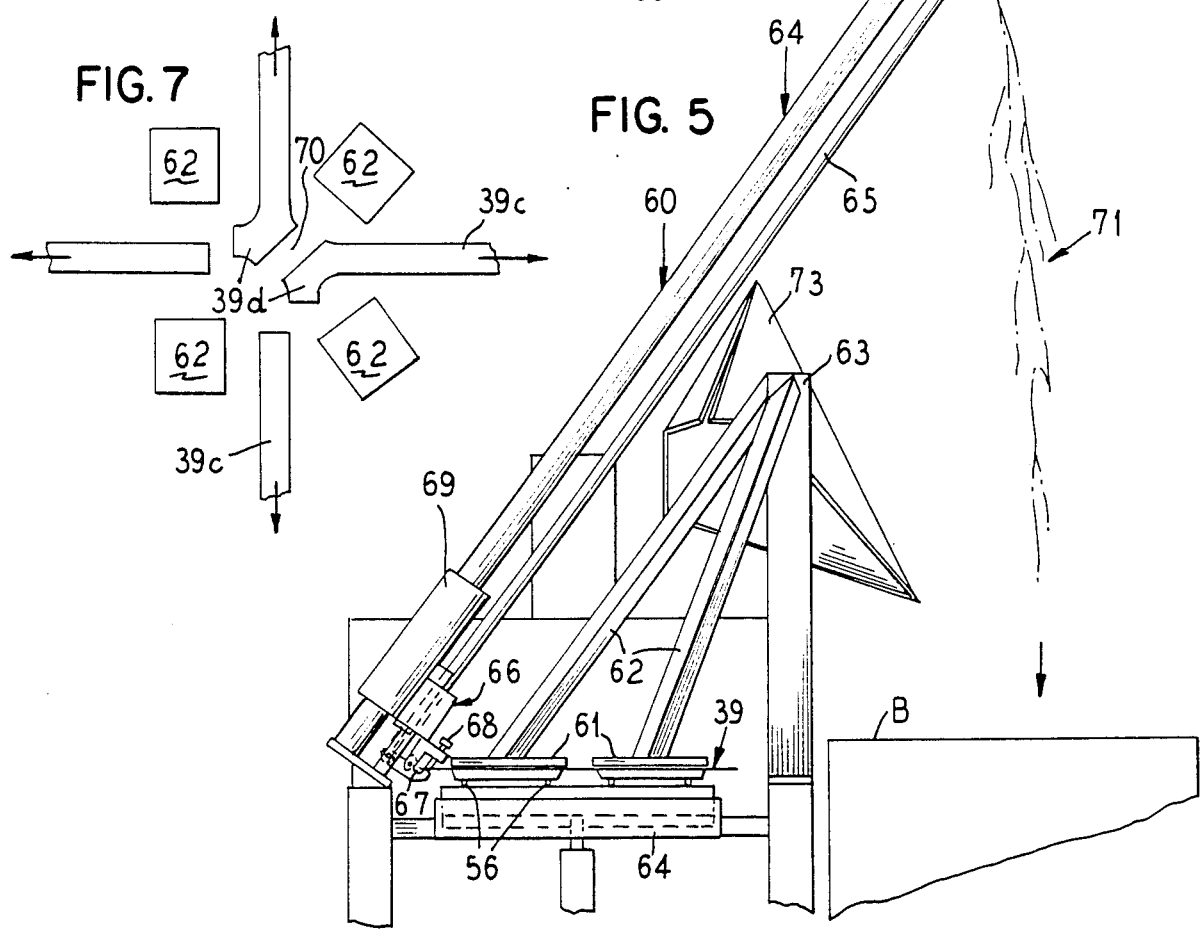

U.S. Patent Dec. 30, 1986 Sheet 4 of 5 4,632,717
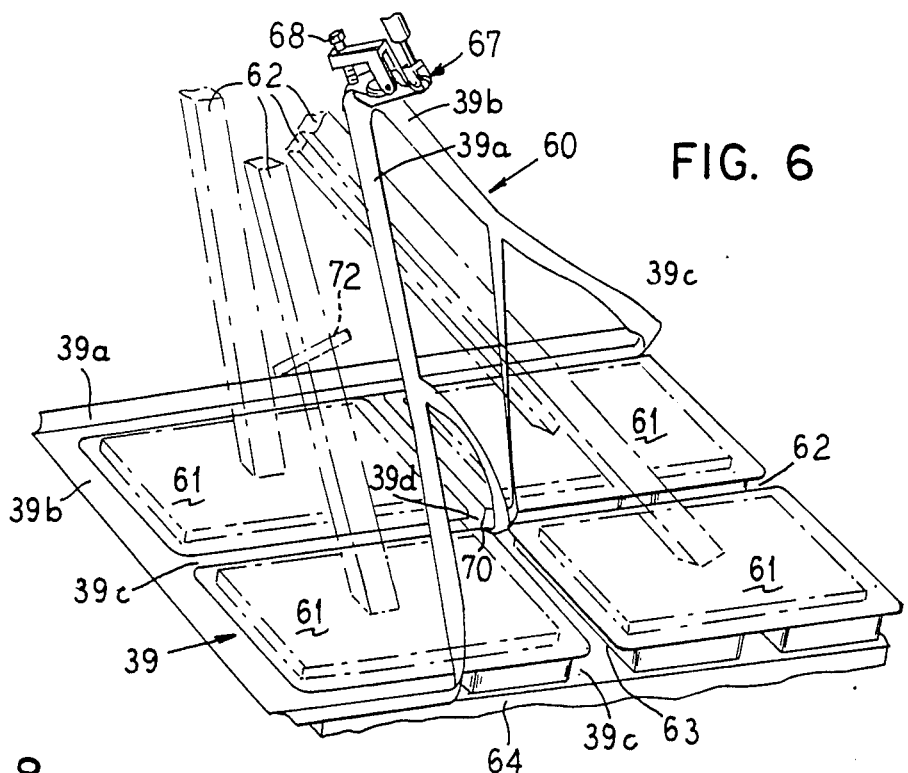
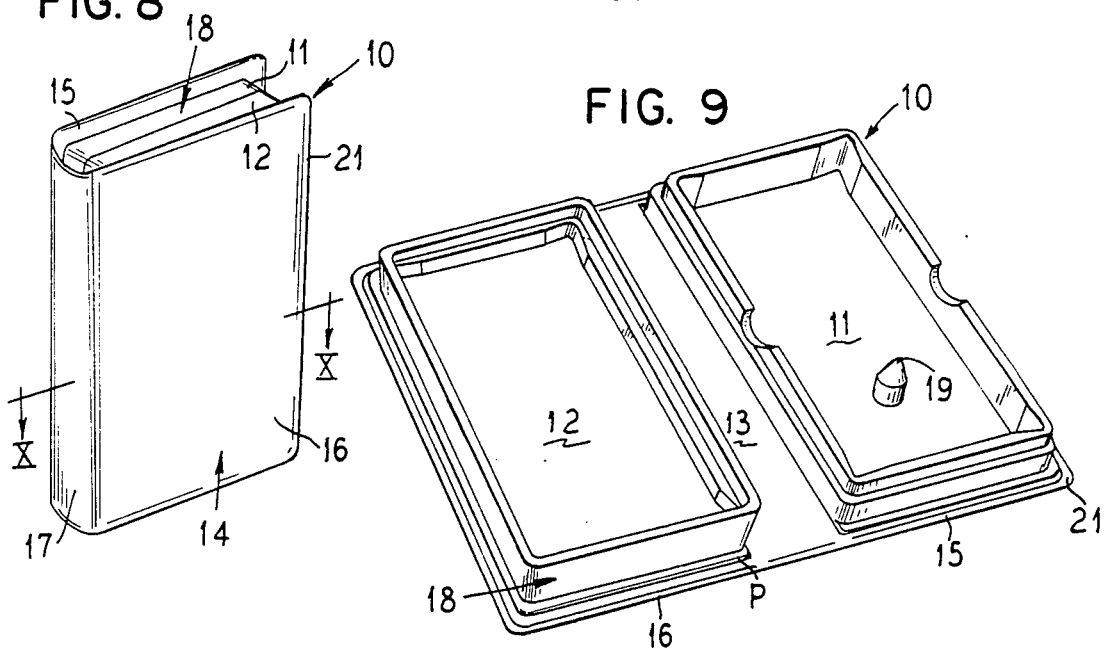

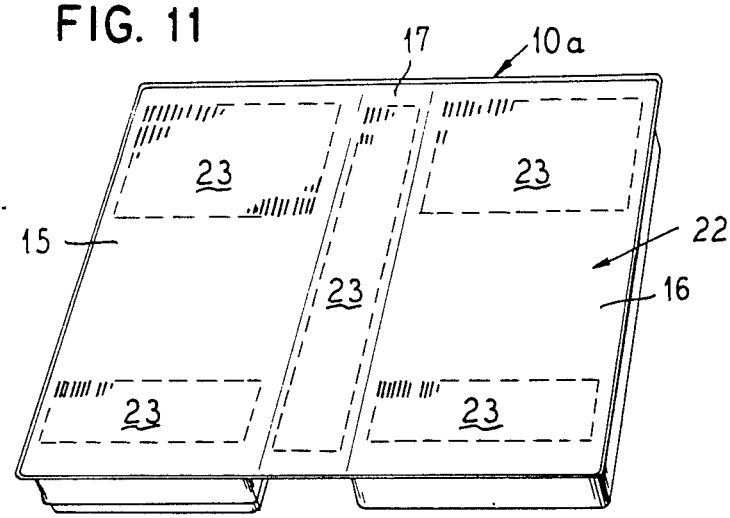
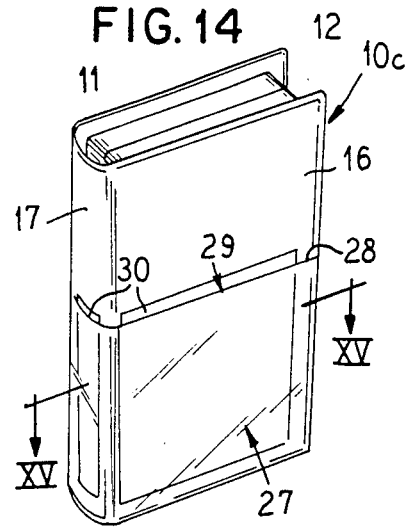
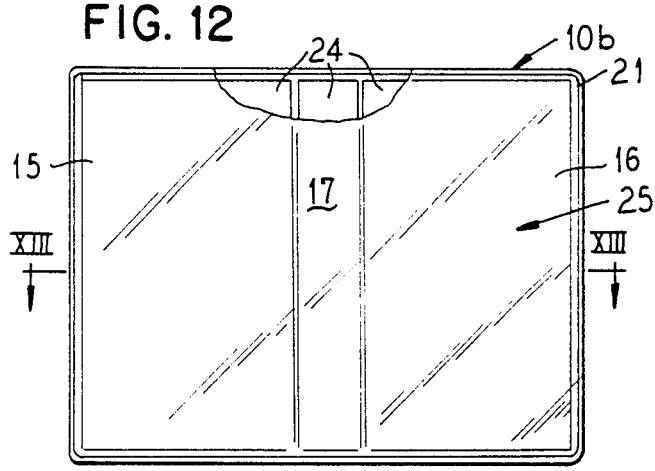
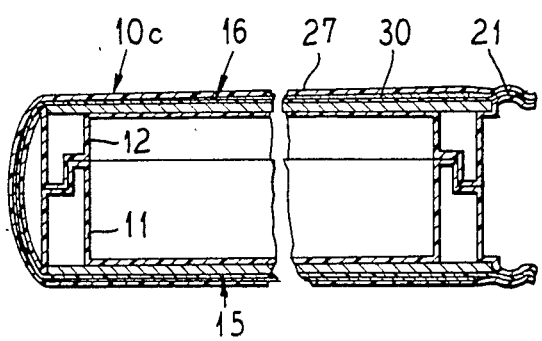
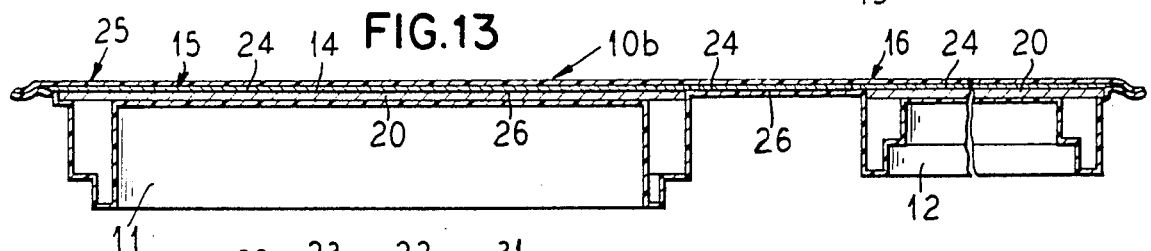
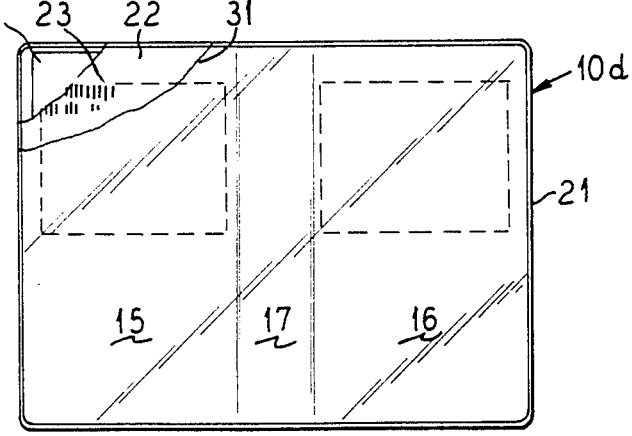

METHOD OF MAKING BOOK STYLE ALBUMS

RELATED APPLICATION

This application is a continuation-in-part of the Herbert Graetz and Ronald C. Unterreiner U.S. patent application entitled "Method of Making Cassette Holders" Ser. No. 601,949, filed Apr. 19, 1984 now U.S. Pat. No. 4,555,290, issued Nov. 26, 1985.

FIELD OF THE INVENTION

This invention relates to the art of making book style albums or holders from thermoplastic sheets and particularly deals with a method whereby different types or styles of the albums are produced to meet customer requests including albums which have a printed or plain cover, a cover with overlying printed sheets covered by a film, a cover having a pocket, and a printed cover covered with a transparent film.

PRIOR DISCLOSURE

Our prior U.S. Pat. Nos. 4,432,827 issued Feb. 21, 1984, and 4,407,410 issued Oct. 4, 1983, disclose book style cassette holders or albums and a method of making the same. Our parent application Ser. No. 601,949 filed Apr. 19, 1984 now U.S. Pat. No. 4,555,290, issued Nov. 26, 1985, discloses another method of making these albums.

It would be an improvement in this art to provide a method of selectively manufacturing book style cassette albums with different types of covers to serve different purposes as required by the users without, however, requiring separate machines for each type of album. The method of this invention therefore provides an in-line operation with stations that can be selectively used or by-passed for producing the desired end product. This method provides albums with plain covers, printed covers, printed inserts, covering films, and film pockets.

SUMMARY OF THIS INVENTION

According to this invention, book style cassette albums or holders of the general type disclosed in our aforesaid U.S. Pat. No. 4,407,410 are selectively fabricated in a single in-line operation with alternate stations that are used or by-passed to provide different types of cover arrangements without requiring separate machinery to provide the different constructions.

In this improved method, a roll of stiff thermoplastic sheet material is unwound into an elongated run with the marginal side edges of the run attached to conveyor belts. The belt supported run is successively heated and thermoformed into album blanks composed of a plurality of pairs of adjacent trays with the trays of each pair connected by an intermediate spine and with the adjacent albums connected by narrow margins. The run is transversely severed into successive blanks which are advanced on the belts through a glue station, a slab depositing station, a station which applies individual cover sheets, a station which applies a continuous cover sheet, a station which applies printed inserts, a station which supplies a covering film, and subsequent stations which bond the superimposed sheets, sever the blanks into the individual albums, remove the marginal waste material and convey the albums to an inspection and discharge station.

The printed sheet applying station, the continuous cover sheet applying station, the printed insert applying station, and the film applying station are selectively operated or by-passed to provide a wide selection of album cover arrangements including, for example, albums having:

(1) Trays, slabs, and a printed or embossed sheet cover.

(2) Trays, slabs, and a continuous plain cover.

(3) Trays, slabs, a continuous plain cover, printed inserts overlying the cover, and a transparent film covering the inserts which can also be printed.

(4) Trays, slabs, a continuous plain cover, and a pocket film overlying the plain cover.

(5) Trays, slabs, a printed cover, and a transparent film overlying the printed cover.

The conveyor belts support the thermoformed tray and spline blanks through all of the stations up to and including the bonding and severing station. At the discharge end of this bonding and severing station, the individual blanks composed of the bonded together superimposed sheets are automatically pulled to a conveyor which advances the blanks through a cutting station where the continuous cover and film is cut to completely separate the blanks and then through a waste removal station where the severed margin portions of the blanks are removed. The individual albums are then advanced on the conveyor to an inspection station where they are manually closed and stacked or boxed for shipment.

An important feature of the method is the selective use and nonuse or by-passing of successive in-line stations to modify the cover structures for the albums.

Another important feature of the invention is the severing or weakening of the margins of the blanks so that strips of waste material can be automatically pulled free from the albums.

It is then an object of this invention to improve the method of our aforesaid application Ser. No. 601,949, filed Apr. 19, 1984, to selectively produce different types of album cover arrangements.

Another object of this invention is to provide an in line method of making thermoplastic cassette holders or albums which uses or by-passes stations to change cover arrangements for the albums without requiring separate machines to produce the different types of albums.

Another object of this invention is to provide a method of automatically stripping severed waste margin material from album blanks.

A further object of this invention is to provide a method of making tray type albums from thermoplastic sheet material where the album covers can be silk screened printed individual sheets or plain continuous sheets.

A further object of the invention is to provide a method of making cassette albums from thermoplastic sheet material wherein the cover sheet has printed sheets applied thereon and sealed under a transparent film sheet bonded to the cover sheet.

A still further object of the invention is to provide a method of making book-style cassette holders where the covers of the holders are varied to suit customer specifications without requiring separate machines.

Other and further objects of this invention will become apparent to those skilled in this art from the following detailed description of the annexed sheets of drawings which show a preferred method of this invention and illustrate the various types of albums produced by this method.

ON THE DRAWINGS

FIG. 2 is a digrammatic top plan view illustrating the in-line method of FIG. 1.

FIG. 4 is a fragmentary and broken plan view of the stripping station.

FIG. 5 is a fragmentary side elevational view of the stripping station.

FIG. 6 is a fragmentary perspective view of the stripping station.

FIG. 7 is a diagrammatic plan view illustrating the stripping and discharging step.

FIG. 8 is a perspective view of one type of holder or album made by the method of this invention and shown in the closed position.

FIG. 9 is a perspective view showing the album of FIG. 8 in an opened position.

FIG. 10 is a transverse sectional view of the closed album taken along the line X—X of FIG. 8.

FIG. 11 is a perspective view similar to FIG. 9, but showing the cover side of the opened album with silk screened indicia on the cover.

FIG. 12 is a plan view of the cover side of an opened album showing an alternate cover arrangement where printed inserts are positioned on a plain cover and in turn are sealed in position with an overlying film.

FIG. 13 is a fragmentary sectional view along the line XIII—XIII of FIG. 12 showing the overlying cover layers.

FIG. 14 is a view similar to FIG. 8, but showing an alternate cover arrangement with a film pocket.

FIG. 15 is a sectional view along the line XV—XV of FIG. 14 showing the layers of the cover.

FIG. 16 is a plan view like FIG. 12 but showing another cover arrangement with a printed cover having an overlying film.

DESCRIPTION OF THE PREFERRED BEST MODE EMBODIMENT SHOWN ON THE DRAWINGS

Figure 1:
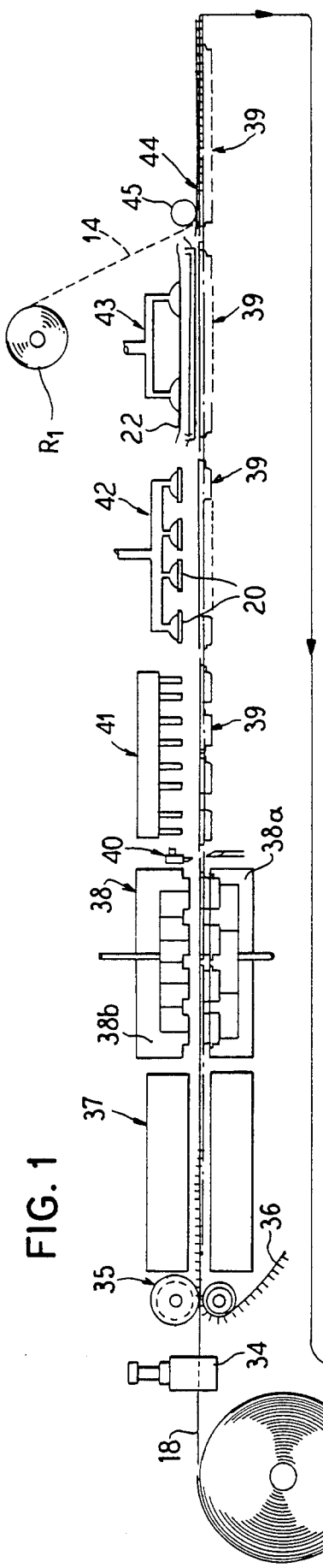
FIG. 1 is a diagrammatic side view illustrating the in-line method of this invention.

The cassette holders or book stype albums of FIGS. 8-15 exemplify the articles made by the method of this invention. Thus, the holder 10 of FIGS. 8 and 10 has a pair of relatively rigid interfitting trays 11 and 12 which are stacked together in the closed position shown in FIGS. 8-10 and which are separated in spaced parallel side-by-side relation by an integral flexible spine liner portion 13 when in the flat open position of FIG. 9. A thermoplastic resin sheet cover 14 has a rear or bottom flap 15 overlying the tray 11 and a front or top flap 16 overlying the tray 12 with an integral spine 17 connecting the flaps 15 and 16 around the back of the holder.

The trays 11 and 12 are formed by vacuum molding a relatively rigid or stiff single sheet 18 of thermoplastic resin with a peripheral margin bonded to the thermoplastic resin sheet cover 14 and with the connecting spine portion 13 between the trays forming a liner underlining the spine portion 17 of the cover. The cover sheet 14 is preferably a flexible polyvinyl chloride plasticized resin sheet having a thickness within the range of 0.01 to 0.018 inches. The tray sheet 18 is a relatively rigid or stiff nonplasticized polyvinyl chloride resin sheet with a thickness in the general range of 0.01 to 0.030 inches.

The upstanding sidewalls of the trays 11 and 12 are hollow and as more specifically described in our aforesaid U.S. Pat. No. 4,407,410, the tops or ends of these walls are stepped to interfit together. The walls surround flat tray bottoms which are somewhat depressed from their original plane of the flat sheet 18 to form pockets P in the hollow side of the molded sheet. A cylindrical cassette locator pin 19 is molded in the flat bottom of the tray 11 for receiving the hub of a reel of a video cassette.

Rigid rectangular cardboard slabs 20 fit in the pockets P, overlying the bottoms of the trays 11 and 12 and covered by the flaps 15 and 16 of the cover 14.

The cover sheet 14 and the tray sheet 18 are sealed together around a crimped bead peripheral edge 21 which projects beyond the upstanding walls of the trays 11 and 12, providing a book cover edge for the album to hide the trays within the confines of the cover. The spine liner 13 connecting the trays 11 and 12 and the spine 17 connecting the cover flaps 15 and 16 are not bonded together. Thus, the cardboard slabs 20 are sealed in place in the pockets P between the bottoms of the trays and the cover flaps. The crimped bead 21 provides a finished margin for the album.

The spine liner portion 13 of the tray sheet 18 and the spine portion 17 of the cover sheet 14 are wider than the stacked closed height of the trays 11 and 12 and are flexible across their entire width so that when the album is closed, as illustrated in FIGS. 8 and 10, the spine and its liner will be arcuately bowed outwardly. A wide flexible hinge is provided between the flaps distributing bending stresses. The outward bowed spine in the closed position of the album provides a round back for the book similating expensive bound book covers. The basic holder or album 10 of FIGS. 8-10 is thus composed of a thermoformed plastic tray sheet 18 and a cover sheet 14. This cover sheet may subsequently have printed or written sheets pasted thereon to identify the contents of the album.

The album 10 of FIGS. 8-10 may be modified in the method of this invention to provide an alternate album 10a of FIG. 11 where the cover sheet 22 has indicia 23 thereon which may be embossed. The indicia is preferably applied by the conventional silk screening method and is precisely positioned on the flaps 15 and 16 and on the spine 17. The silk screened and embossed cover sheets are individually laid on the thermoformed tray blanks, according to the method of this invention, to insure accurate positioning of the indicia on the flaps and spine of the album.

In a further modified album 10b of FIGS. 12 and 13, produced by the method of this invention, printed insert paper sheets 24 are deposited on the flaps 15 and 16 of the cover 14 and if desired also on the spine 17. These printed insert sheets 24 are sealed on the cover by an overlying film 25 secured to the album around its periphery by the same crimped bond 21 securing the cover sheet to the tray sheet. This film 25 is a thin clear plasticized flexible polyvinyl chloride resin sheet having a thickness in the range of 0.004 to 0.012. The printed indicia on the insert sheets 24 is clearly visible through this transparent film and the film is held tightly against the cover to secure the printed sheets in position as shown in FIG. 13 which illustrates the tight sandwiching of the printed sheets between the film 25 and cover 14.

If desired, the printed sheets 24 can be adhesively bonded to the flaps and spine of the cover 14 as illustrated at 26.

In a still further modified or alternate album 10c made by the method of this invention as illustrated in FIGS. 14 and 15, a film strip 27 overlying part or all of the cover flaps 15 and 16 and spine 17 is bonded to the plain cover of the album 10 around its bottom and side edges at the same crimped bond 21 securing the cover and tray sheets together This film then has an open top end 28 providing an accessible pocket 29 for receiving sheet material therein which can removably retain rental slips, printed sheets describing the contents of the album, title sheets, index indicia, etc. illustrated generally at 30.

A still further modified album 10d of FIG. 16 can be produced by the method of this invention. This album 10d is like the album 10a with the silk screened cover 22 having printing or embossments thereof, but in addition a protecting overlying film 31 covers all of the flap and spine portions of the silk screened and embossed cover sheet 22. The film 31 is bonded around its entire periphery at the crimped seal 21.

As will now be desribed, the method of this invention produces the five modified or alternate album constructions of FIGS. 8–16 without requiring separate individual machines and thus produces a wide selection of album constructions at low costs.

The method of this invention for making the album of FIGS. 8–16 is diagrammatically illustrated in FIGS. 1 and 2. As therein shown, a reel R of the stiff or rigid polyvinyl chloride sheet material 18 is unwound forming a horizontal run which is fed through a first station 34 where semicircular notches 34a are punched into the side edges of the sheet at intervals defining the length of a blank to be cut from the sheet. The sheet 18 need only about 19 inches wide to form a blank producing four sets of album trays.

The horizontal run of the notched sheet 18 is then fed through a second station 35 where the notched longitudinal margins of the sheet are punched to receive needle belts 36 which convey the sheet flat-wise through a third station 37 which heats the sheet to a soft condition for thermomolding. The sheet is then conveyed to a thermoforming station 38 having a bottom evacuated die 38a and a top air pressure head 38b. This station 38 has die cavities to form a blank illustrated at 39 in FIG. 3 where two side-by-side rows of four pairs of trays 11 and 12, described above, are formed by pulling the sheet down into the die 38a under vacuum and by using air pressure from the head 38b to press the sheet tightly against the die walls. The trays 11 and 12 have the hollow peripheral walls described hereinabove and the trays of each pair are separated by the intervening spine liner 13.

After the thermoforming in station 38 is completed, the sheet is ejected from the die and advanced through a cutting station 40 where it is severed at the notches 34a produced in the first station 34 to form the individual successive blanks 39. The cutter 40 severs the blank 39 from the continuous run of the sheet 18 while it is still supported on the needle belts 36.

Figure 3:
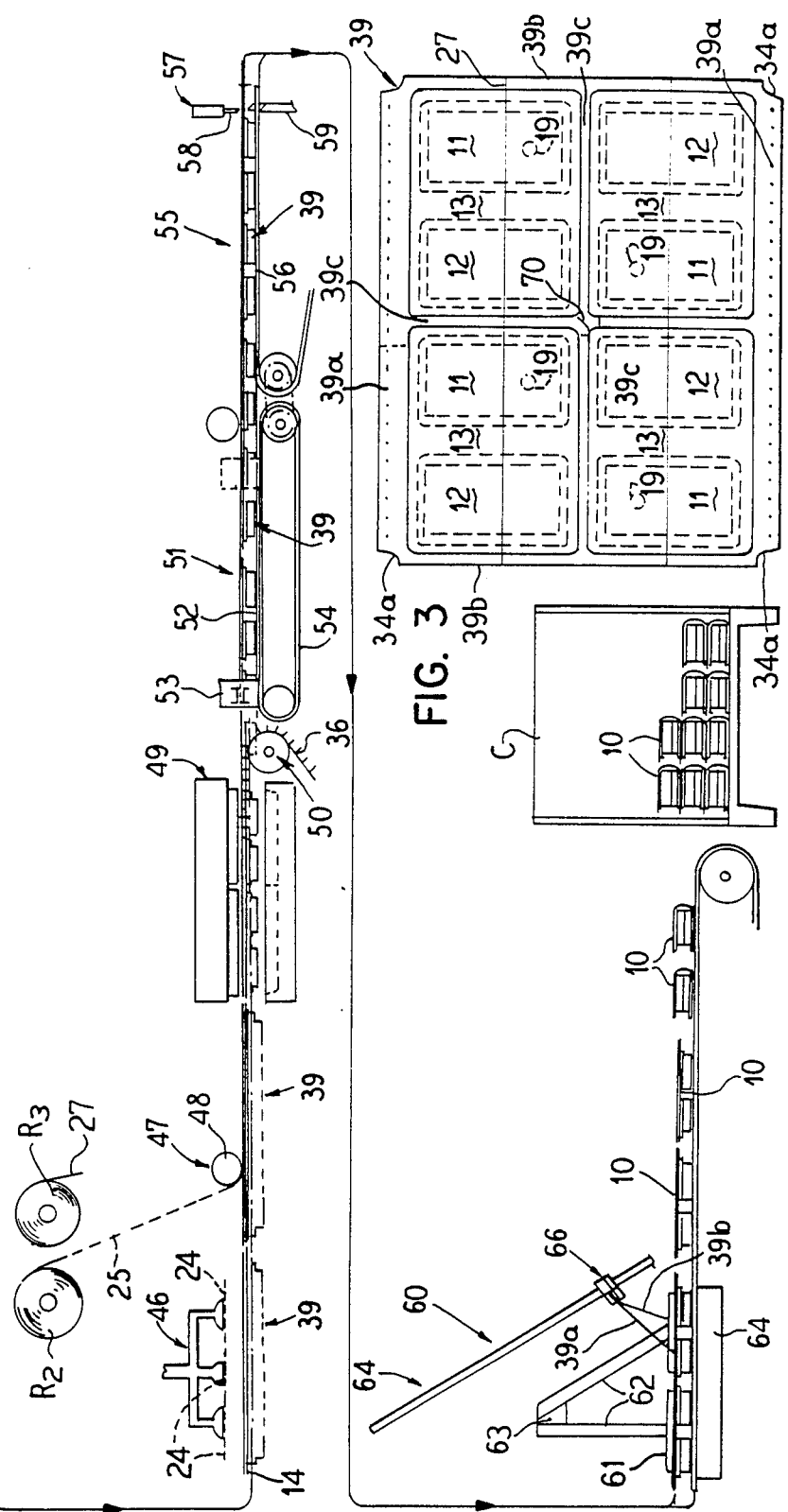
FIG. 3 is a plan view of a blank emerging from the bonding and severing station of the method.

The blank 39 of FIG. 3 has relatively narrow side margins 39a perforated by the needles of the belts 36. These margins need only be in the nature of one inch or less in width. Transverse margins 39b at the front and rear ends of the blank 39 are very narrow in the nature of one fourth to one eighth inch wide. Transverse and longitudinal trim margins 39c between the pairs of molded trays 11 and 12 are also very narrow being of about the same order as the transverse margins 39b. As will be hereinafter explained, an important feature of this invention is the manner in which the minimum waste material provided by the margins 39a, 39b and 39c is lifted from the albums.

The needle belts 36 convey the blanks 39 successively under a glue spotting station 41 where droplets of adhesive are deposited in the rims of the pockets P of the thermoformed tray portions of the blank as described in FIG. 10.

Next, the blank 39 is advanced to a cardboard slab applying station 42 where suction heads pick up the cardboard slabs 20 from a side table T and deposit them into the pockets P over the glue spots provided in these pockets by the station 41.

According to this invention, alternately used cover applying stations 43 and 44 follow the station 42. The station 43 has suction heads picking up individual silk screened and/or embossed cover sheets 22 from a second side table $T_1$. The suction heads accurately position the sheet 22 over the blank 39 and the slabs 20 in the pockets P so that printed and embossed indicia will be accurately centered as desired on the cover flaps and spine of the album. This station 43 thus produces the cover for the album 10a.

The succeeding station 44 applies the cover sheet 14 of the album 10 of FIGS. 8–10. In this station, the cover sheet 14 is unreeled from an overhead roll $R_1$ under an applicator roll 45. The sheet 14 is maintained in a taut condition so that the portion thereof covering the thermoformed blank 39 and the slabs 20 is free from wrinkles and smoothly spans the hollow top of the blank 39.

The station 44 is followed by a station 46 where suction heads feed printed insert sheets 24 from a side table $T_2$ to overlie the cover 14 at selected locations such as over the flaps and spine portion of this yet uncut cover sheet 14.

The next station 47 applies the film overlay 25 over the printed sheets 24 to form the album 10b of FIGS. 12 and 13. The film 25 is unreeled from a roll $R_2$ under an applicator roll 48 which deposits the film in a taut condition over the blank 39.

The station 46, like the station 43, can be by-passed and the station 47 supplied with a narrow film strip 27 from a reel $R_3$ to form the pocket album 10c of FIGS. 14 and 15. This narrow strip 27 may be applied with the same applicator roll 48 used for the film 25, but as shown in FIG. 3, the strip 27 only covers the longitudinal center portion of the cover on the blank 39 to provide the open top pocket of the album 10c.

In addition, the stations 44 and 46 can be by-passed with the station 43 presenting the silk screened or embossed covers 22 on the blanks 39 to the station 47 where the film 25 is applied over the cover sheet 22 to protect the silk screening and embossments of the cover thus forming the album 10d of FIG. 16.

The blank 39 with the bottom thermoformed tray section, the cardboard slabs, the cover, the inserts, and the film depending upon which of the stations 43, 44, 46 and 47 have been used or by passed, is fed, while still supported on the belts 36, to a sealing and cutting station 49. This station has suction fingers F pulling the stacked components tightly together to exhaust any trapped air therebetween which might form wrinkles during the bonding operation. In this station 49, the stacked sheets are all bonded together forming the crimped bond 21 around the periphery of each album portion of the blank. This crimped bond isolates the narrow margins 39a, 39b, and 39c surrounding and between the individual albums of the blank and cutters or hot burn through dies surrounding the bonding electrode which forms the crimped bond, sever the individual albums from the margins or at least sufficiently weaken the connections between the margins and the blank so that they can be easily stripped from the blank.

The needle belts 36 convey the bonded and severed blanks to a point just beyond the station 49 where the belts are wrapped around wheels or pulleys 50 and separated from the blanks for return runs back to the station 35. The needle belts feed the freed portions of the blanks forwardly to a station 51 having a flat support surface 52 over which the bottoms of the blanks can slide. Reciprocating grippers 53 mounted on an endless chain drive support 54 engage the side margins 39a of the blanks and push the blanks over the support surface 52 to discharge them to a conveyor station 55. The grippers 53 reciprocate from positions immediately adjacent the station 49 to a discharge position immediately adjacent the station 55 and they are reciprocated along the length the station 51 by the chain drive 54 to transfer the blanks 39 from the station 49 to the station 55. It will, of course, be understood that the grippers 53 are closed at their forward position adjacent the station 49 to tightly grip the margins 39a of each blank 39 and are then opened adjacent the station 55 to free the blanks for movement with a conveyor belt of the station 55. The grippers engage the margins 39a downstream from leading ends so that about one half of the blank is pushed forwardly ahead of the grippers to ride onto the conveyor belts 56 of the station 55. These belts are flexible plastic ropes in spaced parallel relation across the widths of the blanks 39.

A cutting station 57 is provided to act through the belt ropes for severing the continuous cover or film which connects the blanks 39. It includes an elongated heated electrode 58 overlying the blanks on the conveyor belts 56 and fingers 59 underlying the blanks and operating in the spaces between the narrow rope-like belts 56 to push the transverse margins 39b of the blanks against the electrode 58 thereby severing the blanks into individual units or at least sufficiently weakening the margins 39b so that the blanks are easily separated by a downstream waste removal station 60.

The station 60 as illustrated in more detail in FIGS. 4-6, has four horizontal plates 61 each sized to overlie one of the four album portions of the blank 39. Longitudinal gaps 62 and transverse gaps 63 are provided between the plates so that the margins 39a, 39b and 39c of the blanks are uncovered. The plates 61 are supported on the ends of an "A" frame having four upstanding posts or struts 62 which converge to a post supported apex 63 as shown in FIGS. 4 and 5.

An elevator bottom platform 64 (FIGS. 5 and 6) raises the blank tightly against the plates 61.

A stripper mechanism 64 is mounted in the station 60 to grip a corner of the margin of the blank 39, peel it off of the albums, and discharge it laterally of the station 60. This mechanism includes slide rods 65 mounted at an angle of about 45° and extending upwardly from the right hand forward corner of a blank 39 gripped in the station 60 against the plates 61. These rods slidably support an electromagnetically controlled gripper mechanism 66 having a pivoted finger 67 (FIG. 5) and an adjustable top bolt 68 opposing the free end of the finger 67 to cooperate therewith in gripping the front corner of the margin 39a of the blank 39 in the station. The arrangement is such that the finger 67 is pivoted to a downward open position which clears the margin of the blank and then when the bolt 68 contacts this margin, the finger is pivoted to its closed gripping position shown in FIG. 5. The gripper mechanism 66 is powered by a pneumatic cylinder 69 which reciprocates it from the lowermost position shown in solid lines in FIG. 5 to the dotted line upper position.

As shown in FIG. 7, the intersecting section 39d of the transverse longitudinal margin strips 39c has been severed diagonally as illustrated at 70. This severing or weakening is performed in the station 49. Then, when the gripper 66 engages the forward corner of the margin 39a and is pulled upwardly, the margin strips 39c will ride over the posts 62 and will be separated from the album to form a waste member 71 illustrated in FIG. 5 composed of the margins 39a, 39b and 39c. Since, however, the margins 39a and 39b form a closed periphery strip, one of the corners of this strip must be cut to completely free the waste 71 from the stripping apparatus 64. This is accomplished by providing a hacksaw blade 72 on a post 62 in the path of a corner of the closed periphery margin strip as the waste material is raised to the discharge position of FIG. 5. This corner is thus easily severed to open up the peripheal margin and permit the waste material 71 to hang downwardly as shown in FIG. 5. When the gripper 66 reaches its upmost position as shown in FIG. 5, the finger is released and the waste material is dropped into a collecting bin B alongside the station 60.

A hood 73 guides the waste margin materials 71 so that it will slide into the bin B.

The four albums of each blank 39 are now separated by the stripping operation in station 60 and the belt ropes 56 convey these separated albums 10 along a run where they can be inspected and manually closed from the flat open position, for example as shown in FIG. 9, to the closed position as shown in FIG. 8. The closed albums are then manually stacked in a container C for shipment or packing.

In an alternate set-up of the apparatus for performing a method of this invention, the station 43 may be omitted and the station 46 utilized to selectively apply either the printed insert sheets 24 as shown or the individual cover sheets 22 shown in the station 43. In this arrangement the station 44 is used to apply the cover 14 when the printed inserts are applied on the station 43 or the station 44 is by-passed when the station 46 applies the cover sheets 22. The station 46 can thus serve a dual function but must be manually changed for each function. The inclusion of the station 43 eliminates this changeover and also expands the method to apply both the sheets 22 and 24 to produce albums with printed and embossed covers 22 having partial overlies of printed inserts 24 which in turn are covered by the film 25 in the station 47.

From the above descriptions it will thus be understood that this invention now provides an in-line method of making different types of cassette holders or book style albums with minimum labor requirement and without necessity for separate machines to vary the type or style of the album being produced. Stations in the in-line operation are selectively by-passed or used to produce a wide variety of album types.

The method of this invention is serviced with a minimum amount of manpower and the various step by step operations are automatically triggered, for example, from the notched portions 39a. The blanks are thus sequentially advanced through the various stations in time intervals accommodating the slowest operating station such as the bonding and severing station 49.

We claim as our invention:

1. The method of making book style albums which comprises forming an elongated run of stiff thermoplastic sheet material, thermoforming said run into multiple album blanks having peripheral margins and transverse and longitudinal intersecting margins between the albums, successively advancing the blanks through in-line stations which apply individual covers, continuous covers, printed inserts, and transparent cover films to the blanks, by-passing selected stations to provide desired types of album cover arrangements, welding the blanks and the covers together, severing the margin material of the blanks from the albums, stripping the severed margin material from the albums, conveying the individual albums to an inspection and closing station, and discharging the finished albums.

2. The method of selectively manufacturing book style albums having plain covers, printed covers, covers with overlying printed sheets and transparent films, and covers with pockets which comprises forming an elongated run of stiff thermoplastic sheet material, thermoforming said run into album blanks each having a plurality of rows of album trays and spines in side-by-side relation connected by margins, successively advancing the blanks through a plurality of stations, selectively using and by-passing stations, which apply individual covers, continuous covers, printed inserts, and transparent cover films to the blanks to selectively produce said album covers, welding the blanks and the covers together, severing the margin material of the blanks from the individual albums, peeling the severed margin material from the albums and conveying the individual albums for inspection and closing.

3. The method of making different styles of albums on a single machine which comprises thermoforming thermoplastic sheet material into blanks having a plurality of album bodies connected by margin strips, successively feeding the blanks through a plurality of stations including stations which apply individual cover sheets to the blanks, a continuous cover sheet to the successive blanks, individual inserts over the covers, transparent film over all or part of the covers, bond the covers to the blanks, and sever the margins from the blanks to separate the albums, and selectively by-passing and using the different cover applying stations, the insert applying station, and the film applying stations to produce different cover arrangements for the albums.

4. The method of claim 3 wherein the bonding of the transparent film cover is limited to the sides of the film to form an open pocket on the album.

5. The method of claim 1 including the added steps of advancing the blanks through stations which apply glue and deposit stiff slabs over the glue to rigidify portions of the blanks.

6. The method of claim 1 wherein the blanks each have a plurality of tray members connected by flexible spines and an added station deposits stiff slabs over the bottoms of the trays in advance of the cover applying stations.

7. The method of claim 1 wherein the individual covers are picked off of a stack by suction heads and deposited on the blanks.

8. The method of claim 1 wherein the continuous cover is applied from a roll of flexible plasticized thermoplastic sheet material.

9. The method of claim 1 wherein the stripping of the severed margin material from the albums is effected by a gripper which peels the margin material from the albums.

10. The method of claim 1 wherein the blanks emerging from the severing station are clamped under spaced plates exposing the margin material and a gripper engages a corner of the margin material and peels the material off of the blanks between the plates.

11. In the method of claim 10, the added step of severing the margin material as it is being peeled.

12. The method of claim 1 wherein the printed inserts are deposited on the cover from a stack by suction heads.

13. The method of claim 1 including the step of piercing the sides of the run with needle belts and conveying the run and the thermoformed blanks on the belts.

14. The method of claim 2 including the step of arranging the stations in a horizontal line with the thermoplastic sheet material fed from a reel at one end of the line and the finished albums discharged at the other end of the line.

15. The method of claim 2 where the blanks are fed through all of the stations including the by-passed stations.

16. The method of claim 2 wherein the continuous covers are supplied from a roll and connect the blanks in end-to-end relation.

17. The method of claim 1 wherein individual covers or printed inserts are selectively applied at a single station.

* * * * *